United States Patent
Wang

(10) Patent No.: US 7,951,743 B2
(45) Date of Patent: *May 31, 2011

(54) PREPARATION OF ULTRA HIGH MOLECULAR WEIGHT LINEAR LOW DENSITY POLYETHYLENE

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/220,941

(22) Filed: Jul. 29, 2008

(65) Prior Publication Data

US 2008/0293562 A1 Nov. 27, 2008

Related U.S. Application Data

(62) Division of application No. 11/528,823, filed on Sep. 28, 2006, now Pat. No. 7,429,635.

(51) Int. Cl.
*B01J 31/38* (2006.01)
*B01J 31/34* (2006.01)
*C08F 4/52* (2006.01)
*C08F 4/64* (2006.01)
*C08F 4/76* (2006.01)

(52) U.S. Cl. ........ 502/113; 502/117; 526/119; 526/118; 526/161; 526/160; 526/172; 526/170; 526/134

(58) Field of Classification Search .............. 502/103, 502/104, 113; 526/172, 161, 134, 119
See application file for complete search history.

(56) References Cited

U.S. PATENT DOCUMENTS

| | | | |
|---|---|---|---|
| 4,424,139 A | 1/1984 | McDaniel et al. | |
| 5,187,236 A * | 2/1993 | Coolbaugh et al. | 525/314 |
| 6,211,311 B1 * | 4/2001 | Wang et al. | 526/131 |
| 6,232,260 B1 | 5/2001 | Nagy et al. | 502/155 |
| 6,265,504 B1 | 7/2001 | Liu et al. | 526/161 |
| 6,376,629 B2 | 4/2002 | Nagy et al. | 526/161 |
| 6,559,251 B1 | 5/2003 | Wang et al. | 526/127 |
| 6,759,361 B2 | 7/2004 | Lynch et al. | 502/102 |
| 6,765,074 B2 | 7/2004 | Sartain | 526/153 |
| 6,767,975 B1 | 7/2004 | Liu | 526/161 |
| 6,794,468 B1 | 9/2004 | Wang | 526/161 |
| 6,841,506 B2 | 1/2005 | Guo et al. | 502/152 |
| 6,861,485 B2 * | 3/2005 | Wang | 526/119 |
| 6,933,353 B2 | 8/2005 | Wang | 526/114 |
| 6,933,354 B2 | 8/2005 | Lynch et al. | 526/161 |
| 6,995,216 B2 * | 2/2006 | Winslow et al. | 526/66 |
| 7,091,272 B2 | 8/2006 | Liu | 524/445 |
| 7,230,056 B2 * | 6/2007 | Wang | 526/153 |
| 7,473,745 B2 * | 1/2009 | Chandrashekar et al. | 526/65 |
| 2003/0195306 A1 * | 10/2003 | Tsuie et al. | 526/127 |
| 2007/0055021 A1 | 3/2007 | Chandrashekar et al. | 525/240 |

FOREIGN PATENT DOCUMENTS

| | | |
|---|---|---|
| EP | 0 362 629 A2 | 4/1990 |
| EP | 0 595 182 A1 | 5/1994 |
| WO | WO 2004/013194 A2 | 2/2004 |
| WO | WO 2007/030278 A1 | 3/2007 |

OTHER PUBLICATIONS

XP-002467318, Mar. 13, 1987, Derwent Publications Ltd.
XP-002467319, Mar. 13, 1987, Derwent Publications Ltd.

* cited by examiner

*Primary Examiner* — Rip A. Lee

(57) ABSTRACT

Disclosed is a method of preparing an ultra-high molecular weight, linear low density polyethylene with a catalyst system that comprises a bridged indenoindolyl transition metal complex, a non-bridged indenoindolyl transition metal complex, an alumoxane activator and a boron-containing activator. The ultra-high molecular weight, linear low density polyethylene has a weight average molecular weight greater than 1,000,000 and a density less than 0.940 g/cm$^3$.

3 Claims, No Drawings

PREPARATION OF ULTRA HIGH MOLECULAR WEIGHT LINEAR LOW DENSITY POLYETHYLENE

This application is a division of application Ser. No. 11/528,823, filed on Sep. 28, 2006, now U.S. Pat. No. 7,429,635.

FIELD OF THE INVENTION

The invention relates to the preparation of an ultra-high molecular weight, linear low density polyethylene, using a catalyst system comprising a bridged and a non-bridged indenoindolyl transition metal complex and two activators.

BACKGROUND OF THE INVENTION

The production of ultra-high molecular weight, high density polyethylene with single site catalysts has been accomplished. For instance, U.S. Pat. No. 6,265,504 discloses a process for preparing an ultra-high molecular weight, high density polyethylene with a heteroatomic ligand-containing single site catalyst and a non-alumoxane activator. Similarly, U.S. Pat. Nos. 6,767,975 and 7,091,272 disclose the preparation of ultra-high molecular weight polyethylene using a combination of a pyridine moiety-containing single site catalysts and clay. The polymerization is performed in the absence of α-olefins and the resulting ultra-high molecular weight polyethylene also has high density.

Although ultra-high molecular weight, high density polyethylene exhibits remarkable toughness and durability, it can suffer from low impact and tear strengths. Linear low-density polyethylene exhibits higher impact and tear strengths. A polyethylene that combines the advantages of ultra-high molecular weight polyethylene with the advantages of linear low density polyethylene would be useful.

SUMMARY OF THE INVENTION

The invention is a method for the preparation of ultra-high molecular weight, linear low density polyethylene. The method comprises polymerizing ethylene and a $C_3$ to $C_{10}$ α-olefin in the presence of a catalyst system comprising a bridged indenoindolyl transition metal complex, a non-bridged indenoindolyl transition metal complex, an alumoxane activator, and a boron-containing activator.

The invention includes an ultra-high molecular weight, linear low density polyethylene. The ultra-high molecular weight, linear low density of the invention has a weight average molecular weight greater than 1,000,000 and a density less than 0.940 g/cm$^3$. Preferably, the ultra-high molecular weight, linear low density of the invention has a weight average molecular weight greater than or equal to 1,500,000 and a density less than or equal to 0.930 g/cm$^3$.

The invention also includes a catalyst system. The catalyst system comprises a bridged indenoindolyl transition metal complex, a non-bridged indenoindolyl transition metal complex, an alumoxane activator, and a boron-containing activator. Polyethylene with high molecular weight and low density is difficult to prepare because the incorporation of α-olefins into the polyethylene normally lowers the molecular weight of the polyethylene in addition to lowering the density. Surprisingly I found that the catalyst system of the invention not only has an improved activity but also produces polyethylenes with ultra-high molecular weight and low density.

DETAILED DESCRIPTION OF THE INVENTION

The invention is a method of preparing an ultra-high molecular weight, linear low density polyethylene. The method comprises polymerizing ethylene and a $C_3$ to $C_{10}$ α-olefin in the presence of a catalyst system comprising a bridged indenoindolyl transition metal complex, a non-bridged indenoindolyl transition metal complex, an alumoxane activator, and a boron-containing activator.

By "ultra-high molecular weight, linear low density polyethylene," I mean that the polyethylene has a weight average molecular weight greater than 1,000,000 and a density less than 0.940 g/cm$^3$. Preferably, the ultra-high molecular weight, linear low density polyethylene has a weight average molecular weight greater than or equal to 1,500,000 and a density less than or equal to 0.930 g/cm$^3$. More preferably, the ultra-high molecular weight, linear low density polyethylene has a weight average molecular weight greater than or equal to 2,000,000 and a density less than or equal to 0.925 g/cm$^3$. Most preferably, the ultra-high molecular weight, linear low density polyethylene has a weight average molecular weight greater than or equal to 2,500,000 and a density less than or equal to 0.915 g/cm$^3$. Particularly preferably, the ultra-high molecular weight, linear low density polyethylene has a weight average molecular weight greater than or equal to 3,000,000 and a density less than or equal to 0.900 g/cm$^3$.

Suitable α-olefins for the polymerization include propylene, 1-butene, 1-pentene, 1-hexene, 1-octene, 4-methyl-1-pentene, the like, and mixtures thereof. More preferably the α-olefin is selected from the group consisting of 1-butene, 1-pentene, 1-hexene and 1-octene and most preferably 1-butene, 1-hexene and 1-octene.

Suitable catalyst system comprises at least two indenoindolyl Group 4 transition metal complexes. By "indenoindole," I mean an organic compound that has both indole and indene rings. The five-member rings from each are fused, i.e., they share two carbon atoms. Preferably, the rings are fused such that the indole nitrogen and the only sp$^3$-hybridized carbon on the indenyl ring are "trans" to each other. Such is the case in an indeno[1,2-b] ring system:

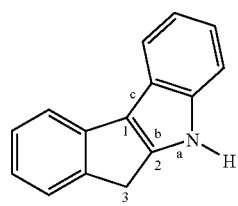

Suitable ring systems also include those, in which the indole nitrogen and the sp$^3$-hybridized carbon of the indene are beta to each other, i.e., they are on the same side of the molecule. This is an indeno[2,1-b]indole ring system:

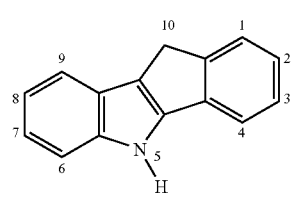

The ring atoms can be substituted. Suitable indenoindolyl ligand includes those represented by

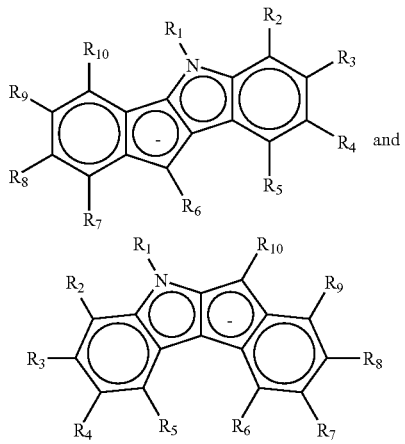

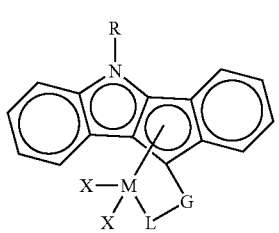

(I)

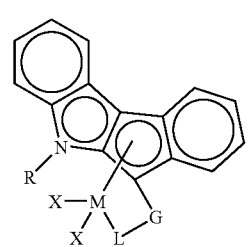

(II)

In the above structures, $R_1$ is preferably selected from the group consisting of alkyl, aryl, aralkyl, and silyl. $R_2$ through $R_{10}$ are the same or different and preferably selected from the group consisting of hydrogen, alkyl, aryl, aralkyl, alkylaryl, silyl, halogen, alkoxy, aryloxy, siloxy, nitro, dialkyl amino, and diaryl amino groups.

Methods for making indenoindole compounds are known in the art. Suitable methods and compounds are disclosed, for example, in U.S. Pat. No. 6,232,260, the teachings of which are incorporated herein by reference.

Of the two indenoindolyl Group 4 transition metal complexes one employs a "bridged" indenoindolyl ligand, and the other employs a "non-bridged" indenoindolyl ligand. The "bridged" indenoindolyl ligand has two attachments. The indenoindolyl ligand is attached to a "bridging" group (G) that connects to a second ligand, and both ligands are coordinated to a transition metal. The "non-bridging" indenoindolyl ligand is attached to the transition metal. The bridged and non-bridged catalysts, respectively, have the following general structures:

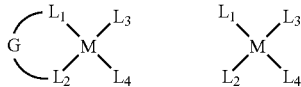

In the above structures, M is a Group 4 transition metal. G is the bridging group. $L_1$ is an indenoindolyl ligand and $L_2$ is a ligand preferably selected from the group consisting of cyclopentadienyls, indenyls, fluorenyls, boraaryls, pyrrolyls, azaborolinyls, quinolinyls, indenoindolyls, and phosphinimines. More preferably, $L_2$ is a cyclopentadienyl ligand.

$L_3$ and $L_4$ are the same or different. $L_3$ and $L_4$ are preferably and independently selected from the group consisting of hydrogen, halogens, alkyls, aryls, alkoxys, aryloxys, siloxys, alkyl aminos, and aryl aminos. Preferably, at least one of $L_3$ or $L_4$ is halogen; more preferably, both $L_3$ and $L_4$ are halogen; most preferably, both $L_3$ and $L_4$ are chlorine.

The bridging group covalently connects the indenoindolyl ligand and the other ligand. Suitable bridging groups include $CR_2$, $C_2R_4$, $SiR_2$, $Si_2R_4$, $GeR_2$, $Ge_2R_4$, $R_2SiCR_2$, NR, and PR. R is preferably and independently selected from the group consisting of alkyls, aryls, the like, and mixtures thereof. The subscripts are equivalent to an exponent, denoting the number of R groups in the bridging group. Preferably the bridging group is selected from the group consisting of dialkylsilyl, diarylsilyl, tetraalkyldisilyl, ethylidene, isopropylidene, methylene, dimethylene, 1,2-diphenylene, 1,4-diphenylene, and the like; most preferably the bridging group is selected from the group consisting of methylene, dimethylene, isopropylidene, dimethylsilyl and the like.

Preferably, the bridged complex is selected from the group consisting those represented by the general structures I-IV, and non-bridged complex is selected from V and VI.

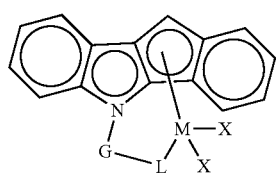

(III)

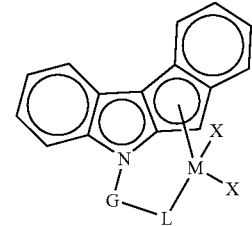

(IV)

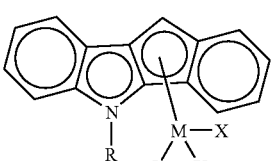

(V)

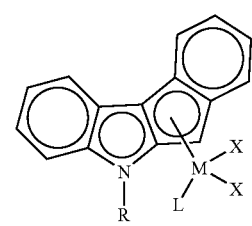

(VI)

In the above structures, M is a Group 4 transition metal; R is preferably selected from the group consisting of alkyl, aryl, aralkyl, boryl and silyl groups; X is preferably selected from the group consisting of alkyl, aryl, alkoxy, aryloxy, halide, dialkylamino, and siloxy groups; L is preferably selected from the group consisting of cyclopentadienyls, indenyls, fluorenyls, boraaryls, pyrrolyls, azaborolinyls, quinolinyls, indenoindolyls, and phosphinimines; G is a bridge group preferably selected from the group consisting of dialkylsilyl, diarylsilyl, methylene, ethylene, isopropylidene, and diphenylmethylene; and one or more of the remaining ring atoms are optionally and independently substituted by alkyl, aryl, aralkyl, alkylaryl, silyl, halogen, alkoxy, aryloxy, siloxy, nitro, dialkyl amino, or diaryl amino groups.

More preferably, the bridged complex has a general structure selected from VII or VIII, and the non-bridged complex has a general structure of IX.

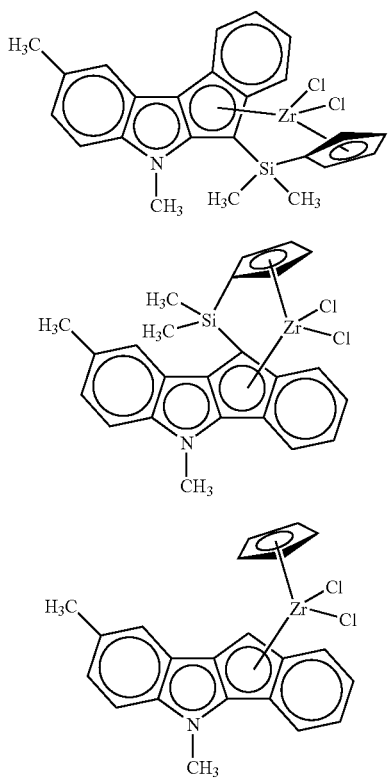

Preferred alumoxane activators include methyl alumoxane (MAO), polymeric methyl alumoxane (PMAO), and their derivatives. Preferred boron-containing activators include tris (pentafluorophenyl)boron, tris(pentabromophenyl) boron, lithium tetrakis(pentafluorophenyl) borate, anilinium tetrakis (pentafluorophenyl) borate, triphenylcarbenium tetrakis(pentafluorophenyl) borate, the like, and mixtures thereof.

Suitable molar ratio of the alumoxane activator to the boron-containing activator is from about 5/1 to about 500/1. Preferably, the molar ratio of alumoxane to borate is from about 100/1 to about 500/1. More preferably, the molar ratio of alumoxane to borate is from about 100/1 to about 300/1.

Activators are generally used in an amount within the range of about 0.01 to about 100,000, preferably from about 0.1 to about 1,000, and most preferably from about 0.5 to about 300 moles per mole of the complexes.

Suitable molar ratio of the bridged to non-bridged complex is within the range of about 1/10 to about 10/1, more preferably from about 1/5 to about 5/1, and most preferably from about 1/3 to about 3/1.

Preferably, the complexes are immobilized on a support. The bridged and non-bridged complexes can be immobilized on the same support or on different supports. Alternatively one complex can be immobilized on a support, and the other complex can be unsupported.

Suitable techniques to support a single-site catalyst are known in the art. For instance, U.S. Pat. No. 6,211,311, which is incorporated herein by reference, discusses supporting heteroatomic ligand-containing single-site catalysts. A supported complex is preferably employed in a slurry or gas phase polymerization process.

The invention includes an ultra-high molecular weight, linear low density polyethylene. The ultra-high molecular weight, linear low density polyethylene is discussed above. Preferably, the ultra-high molecular weight, linear density polyethylene has a molecular weight distribution (the ratio of weight average molecular weight to number average molecular weight is less than or equal to about 5, more preferably less than or equal to about 3.5, and most preferably less than or equal to about 2.5.

The invention also includes a catalyst system. The catalyst system is discussed above. The catalyst system is not only able to produce an ultra-high molecular weight, linear low density polyethylene, but also has an improved catalyst activity.

The following examples merely illustrate the invention. Those skilled in the art will recognize many variations that are within the spirit of the invention and scope of the claims.

EXAMPLE 1

Preparation of Dimethylsilyl-Bridged Indeno[1,2-B]Indolyl Cyclopentadienyl Zirconium Dichloride (a) Preparation of Indeno[1,2-b]indole 1-Indanone (30.6 g, 232 mmol), p-tolylhydrazine hydrochloride (37.0 g, 233 mmol) in EtOH (350 mL), and aqueous HCl (12 N, 18 mL) are mixed and the mixture is heated to reflux for 90 min. The mixture is cooled and filtered, and the solid is washed with EtOH (600 mL) and then by 20% aqueous EtOH (400 mL), and finally by hexane (200 mL). The off-white solid is dried under vacuum (36.5 g, 72%).

(b) N-Methylation

The product from step (a) (36.5 g, 166 mmol), aqueous NaOH solution (112 mL, 20 M, 2.2 mol), $C_{16}H_{33}NMe_3Br$ (0.65 g, 1.78 mmol), and toluene (112 mL) are mixed with vigorous stirring at room temperature. A solution of MeI (17.0 mL, 273 mmol) in toluene (15 mL) is added to the mixture dropwise, and the mixture is then stirred at room temperature for 4 h and refluxed for 3 h. A crystalline solid forms upon cooling and is filtered and washed with cold (−78° C.) EtOH (300 mL) and then with hexane (100 mL). The layers are separated, and the aqueous fraction is washed twice with toluene (100 mL). The organics are combined and dried over $Na_2SO_4$ and filtered. The volatiles are removed under vacuum and the precipitate is dried and combined with the crystalline product (total yield 25.7 g, 66%).

(c) Anion Generation

The product from step (b) (43.9 g, 188 mmol) is dissolved in toluene (560 mL), and n-butyllithium (n-BuLi) (120 mL, 2.5 M, 1.6 mol) is added dropwise to the solution. A precipitate forms after an hour. The mixture is allowed to stand for 48 h and is filtered. The solid is washed with toluene (500 mL) and then with hexane (500 mL), and is dried under vacuum (40.3 g, 90%).

(d) Reaction with Dichlorodimethylsilane

The product from step (c) (23.3 g, 97.4 mmol) is dissolved in toluene (240 mL) and $Et_2O$ (160 mL), and the solution is added to a solution of $SiCl_2Me_2$ (60.0 mL, 495 mmol) in $Et_2O$ (170 mL). The mixture becomes cloudy and is stirred for 48 h and filtered over Celite. Volatiles are removed under vacuum to yield a gray solid (24.8 g, 78%).

(e) Dianion Generation

The product from step (d) (9.62 g, 29.5 mmol) is dissolved in $Et_2O$ (240 mL), and sodium cyclopenta-dienide (16.0 mL, 2 M, 32.0 mmol) is added to the solution. A solid forms immediately, and the mixture is maintained at room temperature overnight. The crude mixture is washed with $H_2O$ (100 mL). The organic phase is dried over $Na_2SO_4$ and filtered. Evaporation to dryness gives an oil. The oil is dissolved in $Et_2O$ (250 mL) and cooled to $-78°$ C. n-Butyllithium (28.0 mL, 2.5 M, 70.0 mmol) is added dropwise to the solution and the mixture warms slowly to room temperature. Stirring continues for 24 h. A yellow solid forms; the mixture is filtered; and the solid is dried under vacuum (12.3 g, 99%).

(f) Preparation of Zirconium Complex

The dianion of from step (e) (7.94 g, 21.6 mmol) is added as a solid to a solution of $ZrCl_4$ (5.03 g, 21.6 mmol) in toluene (250 mL) and $Et_2O$ (50 mL). The mixture turns orange and is maintained at room temperature for 48 h and then filtered. The solid is washed with toluene (200 mL), then hexanes (50 mL), and is dried under vacuum (4.0 g, 36%) to give the complex.

EXAMPLE 2

Preparation of Non-Bridged Indeno[1,2-B]Indolyl Cyclopentadienyl Zirconium Dichloride In a glove box under nitrogen, N-methylated indeno[1,2-b]indole (14.2 g, 60.9 mmol), prepared as described in Example 1, is dissolved in toluene (175 mL). n-Butyllithium (38.0 mL of 2.5 M solution in hexanes, 95 mmol) is added carefully under vigorous stirring at room temperature to give a red solution. After one hour, a precipitate forms. The mixture is kept at room temperature overnight and is then filtered and washed with toluene (100 mL) and then with heptane (200 mL). The sticky product is dried under nitrogen in the glove box and is collected and dried under vacuum.

A sample of the indeno[1,2-b]indolyl lithium salt produced above (10 g, 42 mmol) is dissolved in toluene (95 mL) to produce an orange slurry. Diethyl ether (35 mL) is added slowly to give an orange solution. This solution is added over 15 min. at room temperature with stirring to a slurry of cyclopentadienylzirconium trichloride (11 g, 42 mmol) in toluene (190 mL) and diethyl ether (190 mL). The mixture turns deep red and is kept at room temperature overnight. The slurry is filtered to recover a red solid, which is washed with toluene (200 mL) and dried under vacuum to give the complex (16.5 g, 78%).

EXAMPLE 3

Preparation of MAO-treated Silica Support (a) Calcination of Silica

Silica (CARiACT G-3 (5A), FUJI Silysia Chemical Ltd.) is calcined in an oven where the temperature is increased from room temperature to 200° C. over a 6 hr. period, held at 200° C. for an 8 hr. period, and then the temperature is reduced to room temperature over a 6 hr. period.

(b) Deposition of MAO on the Calcined Silica

In a glove box (room temperature) anhydrous toluene (50 mL) is added to the calcined silica (11.25 g) in a 250 mL Schlenk flask with a magnetic stirrer to form a slurry. Methylalumoxane (40 mL, 30% wt in toluene, product of Albemarle) is slowly added to the silica slurry while stirring for 0.5 hour. The flask is removed from the glove box and placed in an oil batch (80° C.) and stirred for 2 hours and is then cooled to room temperature. The toluene is removed by vacuum and 28.0 g of the resulting white powder is dried further by vacuum.

EXAMPLE 4

Catalyst System Containing Bridged/Non-Bridged Indenoindolyl Complexes MAO/Boron-containing Activators and Polyethylene Prepared therewith In a glove box (room temperature), anhydrous toluene (5 mL) is added to methylalumoxane in a 25 mL Schlenk flask with a magnetic stirrer to form a dilute methylalumoxane solution.

Bridged complex, $Me_2Si$-bridged Cp(indeno[1,2-b]indolyl)zirconium dichloride powder (33.6 mg, 0.073 mmole, from Example 1) and non-bridged complex Cp(indeno[1,2-b]indolyl)zirconium dichloride powder (37.2 mg, 0.073 mmole, from Example 2) are added to the dilute methylalumoxane (MAO) solution. A solution with a dark brown-red color is formed after stirring for 1 hr. (room temperature) and the MAO treated silica MAO (2.0 g, from Example 3) is added to this solution while stirring and mixed for 1 hr. (room temperature). Toluene is removed by vacuum (about 28.5") and further vacuum dried at ambient temperature yielding a powder with beige brown color (2.2 g).

In a glove box (room temperature), 1.0 g of the beige brown powder is placed in 25 mL Schlenk flask, and trityl tetrakis (pentafluorophenyl) borate (0.63 mg or 0.068 mmole boron, $Ph_3CB(C_6F_5)_4$, Fw=922.4 from Asahi) in toluene (3 ml) is added (room temperature). A dark green slurry is formed after mixing for 2 hrs. Toluene is removed by vacuum (about 28.5") at room temperature. The dried powder with dark green color is then washed with hexane and dried again by vacuum (about 28.5") at ambient temperature to yield the catalyst (0.98 g).

A stainless-steel reactor (1-L) is charged with butene-1 (5 mL). Triisobutylaluminum (0.5 mL of 1.0 M solution in heptane) and Armostat 710 fatty amine (1 mg in 0.25 mL solution in heptane, product of Akzo Nobel) are mixed in one sidearm of the injector. This mixture is then flushed into the reactor with isobutane and nitrogen pressure (about 400 mL). The reactor is then pressurized with ethylene to 310 psig. The reactor contents are allowed to equilibrate at 75° C. The above supported catalyst (16 mg) is pre-loaded into the other injector arm and flushed into the reactor with isobutane (90 mL) and nitrogen pressure. The polymerization proceeds until about 90 g resin is produced. The reactor is vented and the polymer is collected and dried. The molecular weight, polydispersity, and density of the polyethylene and the catalyst activity are set forth in Table 1.

EXAMPLE 5

Catalyst System Containing Bridged/Non-Bridged Indenoindolyl Complexes MAO/Boron-containing Activators and Polyethylene Prepared therewith The general procedure of Example 4 is repeated except $Me_2Si$-bridged Cp(indeno[2,1-b]indolyl) zirconium dichloride (37.2 mg, 0.073 mmole) complex powder is used instead of the $Me_2Si$-bridged Cp(indeno[1,2-b]indolyl) zirconium dichloride, which is used in Example 4. The molecular weight, polydispersity, and density of the polyethylene and the catalyst activity are set forth in Table 1.

COMPARATIVE EXAMPLE 6

Catalyst System Containing Only Non-Bridged Complex and Polyethylene Prepared therewith The preparation procedure of Example 4 is followed except only the non-bridged Cp(indeno[1,2-b]indolyl)zirconium dichloride complex (67.2 mg, 0.146 mmol, from Example 2) is used. The molecular weight, polydispersity, and density of the polyethylene and the catalyst activity are set forth in Table 1.

COMPARATIVE EXAMPLE 7

Catalyst System Containing Only Bridged Complex and Polyethylene Prepared therewith The preparation procedure of Example 4 is followed except only the bridged $Me_2Si$-bridged Cp(indeno[1,2-b]indolyl) zirconium dichloride (from Example 1) (74.4 mg, 0.146 mmole) is used. The molecular weight, polydispersity, and density of the polyethylene and the catalyst activity are set forth in Table 1.

COMPARATIVE EXAMPLE 8

Catalyst System Containing Only Bridged Complex and Polyethylene Prepared therewith The preparation procedures of Example 4 is followed except only one complex Me2Si-bridged Cp(indeno[2,1-b]indolyl)zirconium dichloride (74.4 mg, 0.146 mmole) is used. The molecular weight, polydispersity, and density of the polyethylene and the catalyst activity are set forth in Table 1.

COMPARATIVE EXAMPLE 9

Catalyst System Containing Bridged and Non-bridged Complexes but Only MAO Activator and Polyethylene Prepared therewith Example 4 is repeated but no trityl tetrakis(pentafluorophenyl) borate is used. The molecular weight, polydispersity, and density of the polyethylene and the catalyst activity are set forth in Table 1.

COMPARATIVE EXAMPLE 10

Catalyst System Containing Bridged and Non-bridged Complexes but Only MAO Activator and Polyethylene Prepared therewith Example 5 is repeated but no trityl tetrakis(pentafluorophenyl) borate is used. The molecular weight, polydispersity, and density of the polyethylene and the catalyst activity are set forth in Table 1.

TABLE 1

Polyethylene Properties and Catalyst Activities

| Ex. No. | Complex | Activator | Mw (GPC) | Mw/Mn (GPC) | Density (g/cm$^3$) | Activity (g polymer/ g catalyst/hr) |
|---|---|---|---|---|---|---|
| 4 | Bridged/Non-bridged | MAO/Borate | >2,000,000* | 3.5* | 0.925 | 26,460 |
| 5 | Bridged/Non-bridged | MAO/Borate | >3,300,000* | 4.9* | 0.920 | 50,940 |
| C6 | Non-bridged | MAO/Borate | 153,900 | 3.8 | 0.939 | 16,000 |
| C7 | Bridged | MAO/Borate | 272,300 | 3.3 | 0.917 | 28,310 |
| C8 | Bridged | MAO/Borate | 161,500 | 2.6 | 0.924 | 33,260 |
| C9 | Bridged/Non-bridged | MAO | 338,400 | 4.0 | 0.940 | 6,540 |
| C10 | Bridged/Non-bridged | MAO | 217,800 | 2.8 | 0.935 | 14,240 |

*Estimated values because of poor solubility.

I claim:

1. A catalyst system comprising a bridged indenoindolyl transition metal complex, a non-bridged indenoindolyl transition metal complex, an alumoxane activator and a boron-containing activator selected from the group consisting of tris(pentafluorophenyl)boron, tris(pentabromophenyl) boron, lithium tetrakis(pentafluorophenyl) borate, anilinium tetrakis(pentafluorophenyl) borate, triphenylcarbenium tetrakis(pentafluorophenyl) borate, and mixtures thereof, wherein the bridged complex has a structure selected from VII or VIII:

and the non-bridged complex has a general structure of IX:

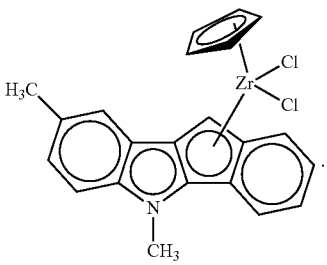

(IX)

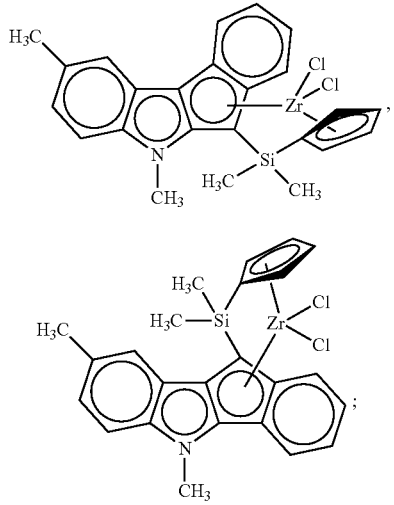

(VII)

(VIII)

2. The catalyst system of claim 1, wherein the molar ratio of the bridged complex to the non-bridged complex is within the range of 1:10 to 10:1.

3. The catalyst system of claim 1, which is immobilized on a support selected from the group consisting of inorganic oxides, inorganic chlorides, organic polymer resins, and mixtures thereof.

* * * * *